(12) United States Patent
Ge et al.

(10) Patent No.: US 11,722,965 B2
(45) Date of Patent: Aug. 8, 2023

(54) METHOD FOR OPTIMIZING MOBILE PHONE TERMINAL BASED ON PROBABILITY OF ENERGY CONSUMPTION-RELATED INTERRUPTION

(71) Applicant: Huazhong University of science and technology, Wuhan (CN)

(72) Inventors: Xiaohu Ge, Wuhan (CN); Kai Cai, Wuhan (CN); Yi Zhong, Wuhan (CN); Qiang Li, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 18/058,994

(22) Filed: Nov. 28, 2022

(65) Prior Publication Data

US 2023/0171702 A1   Jun. 1, 2023

(30) Foreign Application Priority Data

Nov. 26, 2021   (CN) .......................... 202111417886.6

(51) Int. Cl.
  *H04W 52/02*  (2009.01)
  *G06F 17/18*  (2006.01)
(52) U.S. Cl.
  CPC .......... *H04W 52/029* (2013.01); *G06F 17/18* (2013.01)
(58) Field of Classification Search
  CPC .......... H04W 52/029; H04W 52/0261; H04W 52/02; H04W 52/0209; G06F 17/18
  See application file for complete search history.

(56) References Cited

U.S. PATENT DOCUMENTS

2014/0266016 A1   9/2014   Li et al.
2018/0220553 A1*  8/2018   Saeidi ................ H05K 7/20409

FOREIGN PATENT DOCUMENTS

| CN | 101771428 A | 7/2010 |
| CN | 103492974 A | 1/2014 |
| CN | 104412198 A | 3/2015 |
| CN | 104951026 A | 9/2015 |
| CN | 106026264 A | 10/2016 |
| CN | 106339011 A | 1/2017 |
| CN | 108401511 A | 8/2018 |
| CN | 112198944 A | 1/2021 |
| CN | 113423081 A | 9/2021 |

OTHER PUBLICATIONS

Office Action issued in corresponding Chinese Application No. CN202111417886.6, dated Dec. 31, 2021, with English translation.

(Continued)

*Primary Examiner* — Keith Ferguson
(74) *Attorney, Agent, or Firm* — Hamre, Schumann, Mueller & Larson, P.C.

(57) ABSTRACT

A method for optimizing a mobile phone terminal based on a probability of an energy consumption-related interruption is disclosed. The method includes: S1. predicting a probability of an energy consumption-related interruption in real time; and S2. adjusting an operating frequency of a baseband chip of a mobile phone terminal according to the predicted probability of an energy consumption-related interruption.

5 Claims, 2 Drawing Sheets

---

Predict a probability of an energy consumption-related interruption that may occur in a mobile phone terminal device based on an energy consumption-related interruption model according to current conditions of the mobile phone terminal device and a system Dynamically adjust an operating frequency and an operating voltage of a baseband chip of the mobile phone terminal device according to the prediction of the energy consumption-related interruption model (56) References Cited

OTHER PUBLICATIONS

Office Action issued in corresponding Chinese Application No. CN202111417886.6, dated Jan. 30, 2022, with English translation.
Notice of Allowance issued in corresponding Chinese Application No. CN202111417886.6, dated Feb. 14, 2022 with English translation.
Yang et al., "Power-Consumption Outage in Beyond Fifth Generation Mobile Communication Systems", Published in IEEE Transactions on Wireless Communications (vol. 20, No. 2, Feb. 2021).

* cited by examiner

METHOD FOR OPTIMIZING MOBILE PHONE TERMINAL BASED ON PROBABILITY OF ENERGY CONSUMPTION-RELATED INTERRUPTION

TECHNICAL FIELD

The present invention relates to the fields of wireless communication and heat transfer, and more specifically, to a method for optimizing a mobile phone terminal based on a probability of an energy consumption-related interruption.

BACKGROUND ART 5G mobile communication systems have begun to support many high-rate mobile communication applications such as virtual reality and augmented reality. Next-generation mobile communication systems will support higher-rate mobile communication applications such as holographic communication. In a future Beyond 5G (B5G) mobile communication system, high-rate mobile communication applications require Gbps-level transmission rates and seamless network coverage to ensure good quality of experience for users. Currently, a 5G mobile communication system has adopted technologies such as millimeter-wave communication as well as large-scale MIMO to provide mobile terminals with Gbps-level transmission rates. In addition, as a deployment scheme of 5G mobile communication systems, ultra-dense cellular networks can provide mobile terminals with seamless coverage and reduce a probability of a communication interruption between a base station and a mobile terminal. 5G and B5G mobile communication systems are still dominated by terminal devices. The proposal of a maximum reception rate of mobile phone terminal devices indicates that a mobile terminal is still vulnerable to a communication interruption in 5G and B5G mobile communication systems with the characteristics of seamless coverage and high rates. This type of interruption is referred to as an energy consumption-related interruption. Unlike a channel interruption that occurs when a signal reception power is less than an interruption threshold power due to undesirable channel state, the energy consumption-related interruption is associated with computing resources of a baseband chip, heat dissipation, and a communication duration, and belongs to a new interrupt type. The accurate definition and characteristics of energy consumption-related interruptions have not been studied in detail. It is critical in the study of interruptions in B5G mobile communication systems to give the accurate definition and characteristics of energy consumption-related interruptions, establish an energy consumption-related interruption probability model, and analyze the impact of energy consumption-related interruption on mobile communication performances.

In high-rate mobile communication applications, heat generated from the calculation by a baseband chip of a mobile phone terminal device causes an increase in surface temperature. Upon high-rate mobile communication for a period of time, the surface temperature of the mobile phone terminal device is likely to exceed the lowest temperature that can cause a burn on human skin, namely, 45° C. In consideration of user safety, the baseband chip of the mobile phone terminal device reduces the computing capabilities of the mobile phone terminal device to reduce the heat generation amount of the mobile phone terminal device and the surface temperature of the mobile phone terminal device. The reduction in computing capabilities of the baseband chip means a reduction in computing resources of the baseband chip. When the baseband chip has no redundant computing resources for data processing, the performance of a mobile communication system becomes unacceptable, that is, an energy consumption-related interruption occurs.

SUMMARY OF THE INVENTION

In view of the deficiencies and improvement requirements in the prior art, the present invention provides a method for optimizing a mobile phone terminal based on a probability of an energy consumption-related interruption, aiming at reducing the occurrence of an energy consumption-related interruption and avoiding the occurrence of a communication interruption, thereby ensuring the quality of service for users.

To achieve the above objective, according to a first aspect of the present invention, a method for optimizing a mobile phone terminal based on a probability of an energy consumption-related interruption is provided. The method includes: S1. predicting a probability of an energy consumption-related interruption in real time, where the energy consumption-related interruption refers to that in a communication process of a mobile phone terminal, a heat generation power of a chip of the mobile phone causes a temperature of a rear cover of the mobile phone to exceed a human skin safety temperature; and S2. adjusting an operating frequency of a baseband chip of the mobile phone terminal according to the predicted probability of an energy consumption-related interruption.

Preferably, the probability of an energy consumption-related interruption is predicted by using an energy consumption-related interruption probability model in step S1, and the energy consumption-related interruption probability model is as follows:

$$p_{out}[T_{sur}(t)] = P[T_{sur}(t) \geq T_{safe}] = \frac{1}{2} - \frac{\int_0^\infty \mathrm{erf}\left[\frac{X(F_{bit}, t) - \mu}{\theta\sqrt{2}}\right](F_{bit})^{\alpha-1} e^{-\frac{F_{bit}}{\beta}} dF_{bit}}{2(\beta)^\alpha \Gamma(\alpha)}$$

where $$X(F_{bit}, t) = \frac{1}{BF_0 \omega E_t(K_{BB} + N_{tr} F_{bit})} \left[ \frac{h_{air} A(T_{safe} - T_{sur}^0)}{1 - e^{\frac{zt}{c_{chip}m}}} - \lambda Q_{AM} \right]$$

where $p_{out[\ ]}$ represents the probability of an energy consumption-related interruption, $P[\ ]$ represents a probability of occurrence of an event in the square brackets, d represents a symbol d in integral calculus, t represents a communication duration, $T_{sur}(t)$ represents the temperature of the rear cover of the mobile phone, $T_{safe}$ represents a maximum temperature to avoid a burn on human skin, which is also an upper limit of a surface safety temperature for a smartphone, namely, 45° C., $\mathrm{erf}[\ ]$ represents a Gaussian error function, $\mu$ represents an expectation in the Gaussian error function, $\theta$ represents a standard deviation in the Gaussian error function, $F_{bit}$ represents a quantity of CPU cycles required for processing each bit of data, and follows a Gamma distribution, $\alpha$ represents a shape parameter, $\beta$ represents a scale parameter, $X(F_{bit}, t)$ represents a function related to $F_{bit}$ and t, $\Gamma(\alpha)$ represents a Gamma function, B represents a bandwidth, $F_0$ represents a fan-out factor of the baseband chip, ω represents an activation factor of a transistor in the baseband chip, $E_t$ represents switching energy consumption of a single transistor in the baseband chip, $K_{BB}$ represents a quantity of logical operations required for processing each bit of information in a baseband processing algorithm, and the indicator highly correlates with the operating frequency, $N_{tr}$ represents a quantity of transistors in the baseband chip, $h_{air}$ represents an air convective heat transfer coefficient, A represents an area of a heat sink, $T_{sur}^0$ represents an initial temperature of the rear cover, z represents a thermal conductivity, $c_{chip}$ represents a specific heat of the baseband chip, m represents a mass of the baseband chip, λ represents a ratio of heat transferred from a downlink low-noise amplifier and an uplink power amplifier to the baseband chip, and $Q_{AM}$ represents a heat generation power of the low-noise amplifier and the power amplifier.

Beneficial effects: In view of an existing problem that due to a large amount of computation of a mobile phone terminal, a chip generates heat and an overheat of the chip triggers the underclocking of the chip of the mobile phone terminal and causes a computational overload, namely, an energy consumption-related interruption, in the present invention, an indicator for measuring an energy consumption-related interruption is established, a transmission model and a heat transfer model of the mobile phone terminal are established, and an energy consumption-related interruption probability model is established by analyzing random variables in the process of transmission and calculation. A corresponding energy consumption-related interruption probability measurement model is provided for this new type of communication interruption, to deliberately balance the relationship among a chip temperature of a mobile terminal, a communication duration, and a downlink rate, so that an energy consumption-related interruption of the mobile phone terminal can be better predicted, thereby providing data reference for corresponding adjustments to the mobile phone terminal based on a probability of an energy consumption-related interruption.

Preferably, step S2 includes: if a current probability of an energy consumption-related interruption is greater than or equal to 90%, adjusting the operating frequency of the baseband chip to 50% of a current frequency; if the current probability of an energy consumption-related interruption is greater than or equal to 80% and less than 90%, adjusting the operating frequency of the baseband chip to 60% of the current frequency; if the current probability of an energy consumption-related interruption is greater than or equal to 70% and less than 80%, adjusting the operating frequency of the baseband chip to 70% of the current frequency; and if the current probability of an energy consumption-related interruption is greater than or equal to 60% and less than 70%, adjusting the operating frequency of the baseband chip to 80% of the current frequency; and if the current probability of an energy consumption-related interruption is greater than or equal to 50% and less than 60%, adjusting the operating frequency of the baseband chip to 90% of the current frequency; and making no adjustment in other cases.

Beneficial effects: In view of the problem that an existing smartphone terminal has an energy consumption-related interruption, in the present invention, a probability of an energy consumption-related interruption of a mobile phone terminal is predicted in real time, and an operating frequency of a baseband chip is adjusted according to a corresponding algorithm. It is found by analyzing and evaluating the energy consumption of various modules of the smartphone that a CPU of a baseband chip is a module with the highest energy consumption during normal use of the smartphone. The primary power consumption of the CPU of the baseband chip is approximately directly proportional to an operating frequency. The energy consumption and heat generation amount can be effectively reduced without affecting the peak performance of a processor, by adjusting the frequency of the CPU of the baseband chip during the operation of the system. Therefore, the baseband processing energy consumption, application processing energy consumption, and system energy consumption of a chip of a mobile phone terminal can be reduced by adjusting the operating frequency of the baseband chip, so that a probability of an energy consumption-related interruption is reduced, and the occurrence of an energy consumption-related interruption is avoided, thereby ensuring the communication quality for users.

Preferably, the method further includes: S3. obtaining a new operating voltage according to the adjusted operating frequency, and supplying, by a power management module, the same to the CPU of the baseband chip.

Beneficial effects: In view of the problem that an existing a smartphone terminal has an energy consumption-related interruption, in the present invention, a probability of an energy consumption-related interruption of a mobile phone terminal is predicted in real time, and an operating frequency of a baseband chip is adjusted according to a corresponding algorithm. A new operating voltage is obtained according to the adjusted operating frequency, and it is supplied by a power management module to the CPU of the baseband chip. It is found by analyzing and evaluating the energy consumption of various modules of the smartphone that a CPU of a baseband chip is a module with the highest energy consumption during normal use of the smartphone. The primary power consumption of the CPU of the baseband chip is further approximately directly proportional to the square of an operating voltage. For the operating frequency of the baseband chip adjusted according to the corresponding algorithm, a new operating voltage needs to be determined according to the performance changes of a system processor, for example, a temperature change, a load change, a process change, and other related changes, and supplied by the power management module to the CPU of the baseband chip. The mobile phone terminal can be kept stable, and the energy consumption of the mobile phone terminal can be further reduced, which helps to reduce the probability of an energy consumption-related interruption of the mobile phone terminal.

Preferably, an operating voltage and an operating frequency of a component satisfy:

$$f=k(V-V_T)^2/V$$

where k is a constant coefficient, $f$ represents an operating frequency of the CPU, V represents an operating voltage of the CPU, and $V_T$ represents a threshold voltage.

Beneficial effects: In the present invention, an operating voltage is adjusted based on an operating frequency in the foregoing manner. When an operating frequency of a CPU circuit is reduced, an operating voltage decreases accordingly. Therefore, while a probability of an energy consumption-related interruption is reduced by changing an operating frequency and an operating voltage, the impact of the changes on performance must be considered. To ensure stable operation of a component, a relationship between an operating frequency and an operating voltage needs to meet the foregoing formula, so that the operating frequency of the component is coordinated with the operating voltage, thereby ensuring the stable operation of the component.

Preferably, all cores of a multi-core processor are considered as one core, and after the core is adjusted, the same adjustment is made to operating frequencies of the remaining cores.

Beneficial effects: In view of an optimization process of a multi-core processor of a mobile phone terminal, in the present invention, all cores of a multi-core processor are considered as one core, and after the core is adjusted, the same adjustment is made to operating frequencies of the remaining cores. Due to uniform adjustments, the adjustment speed and energy consumption of the process are somewhat advantageous, and it requires low actual overheads to adjust an operating frequency of a CPU of a baseband chip and a corresponding operating voltage, so that energy consumption can be reduced, which helps to reduce a probability of an energy consumption-related interruption.

To achieve the above objective, according to a second aspect of the present invention, a smartphone terminal is provided, including: a computer-readable storage medium and a processor, where the computer-readable storage medium is configured to store executable instructions, and the processor is configured to read the executable instructions stored in the computer-readable storage medium, to perform the method for optimizing a mobile phone terminal based on a probability of an energy consumption-related interruption in the first aspect.

In general, through the foregoing technical solutions designed in the present invention, the following beneficial effects can be obtained:

In the present invention, a probability that an event of an energy consumption-related interruption of a smartphone terminal occurs is predicted in real time. The energy consumption-related interruption is a communication interruption that occurs to avoid a burn when a heat generation power of a chip of a mobile phone causes a temperature of a rear cover of the mobile phone to exceed a human skin safety temperature in a communication process of the mobile phone terminal. An operating frequency of a baseband chip of a phone terminal is adjusted to reduce a probability of an energy consumption-related interruption, to avoid the occurrence of a communication interruption, thereby ensuring the communication quality for users.

DETAILED DESCRIPTION

To make the purpose, technical solution, and advantages of the present invention clearer, the present invention is further described in detail below in connection with the accompanying drawings and embodiments. It should be understood that the specific embodiments described herein are only used to explain the present invention, but not to limit the present invention. In addition, the technical features involved in various embodiments of the present invention described below can be combined with each other as long as they do not constitute a conflict between them.

Figure 1:
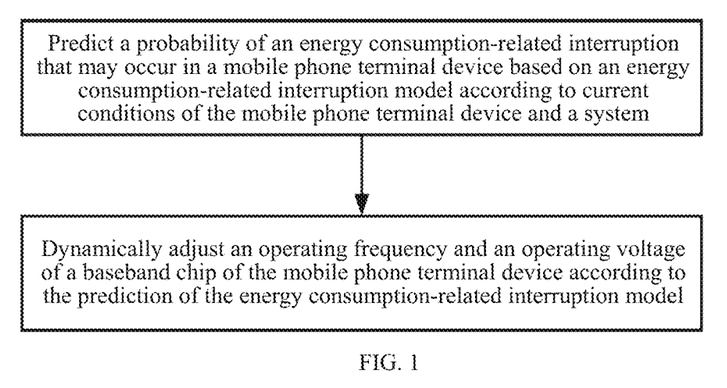
FIG. 1 is a flowchart of a method for optimizing a mobile phone terminal based on a probability of an energy consumption-related interruption according to the present invention.

As shown in FIG. 1, the present invention provides a method for optimizing a mobile phone terminal based on a probability of an energy consumption-related interruption, including:

Step 1: predicting an energy consumption-related interruption that may occur in a mobile phone terminal device based on an energy consumption-related interruption model according to current conditions of the mobile phone terminal device and a system.

The energy consumption-related interruption model performs analysis and prediction on an energy consumption part of a baseband chip of the mobile phone terminal device according to current important parameters of the mobile phone terminal device and the system, to obtain a probability that an energy consumption-related interruption occurs.

Step 2: determining, according to the prediction of the energy consumption-related interruption model, whether a probability that an energy consumption-related interruption occurs in the mobile phone terminal device at a subsequent moment is greater than a set threshold, and if yes, adjust an operating frequency and an operating voltage of the baseband chip of the mobile phone terminal device.

The baseband processing energy consumption, application processing energy consumption, and system energy consumption of a chip can be reduced by adjusting the operating frequency and the operating voltage of the baseband chip of the mobile phone terminal device.

Step 3: adjusting the operating frequency and the operating voltage of the baseband chip of the mobile phone terminal device, so that a probability of an energy consumption-related interruption can be reduced and the occurrence of an energy consumption-related interruption can be avoided, thereby ensuring the normal communication and ensuring the quality of service for users.

Figure 2:
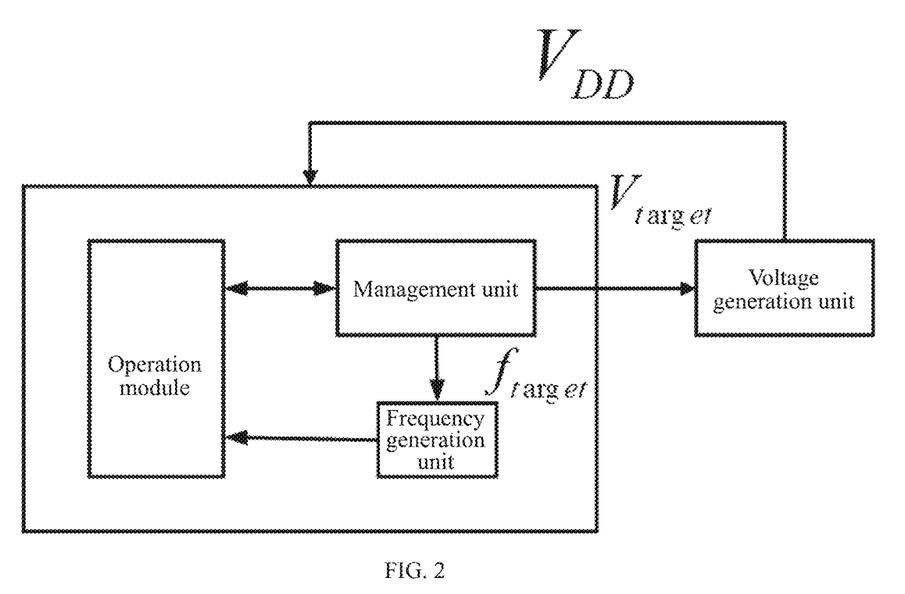
FIG. 2 is a schematic diagram of a system model of communication between a large-scale MIMO base station and a single smartphone according to the present invention.

As shown in FIG. 2, for the energy consumption-related interruption model, a single-user point-to-point large-scale MIMO system is considered, in which the user equipment is a mobile phone terminal device. A base station is equipped with $M_T$ transmit antennas, a smart phone is equipped with $M_R$ receive antennas, and $M_T \gg M_R$ is satisfied. Assuming that the smartphone has known optimal channel state information, a downlink transmission rate may be obtained.

In the energy consumption-related interruption model, for primary energy consumption, energy consumption generated by parts such as core chips of an integrated CPU and a baseband processor of the mobile phone terminal device are considered.

A heat transfer model of the mobile phone terminal device includes heat transfer models of the core chips of the integrated CPU and the baseband processor of the mobile phone terminal device. In a mobile communication process of the mobile phone terminal, heat transferred through a heat sink includes two parts: one part is heat generated by the chip, and the other part is heat transferred from amplifiers to the chip.

The heat transfer model of the mobile phone terminal device further includes that in the heat transfer model, the amplifiers from which heat is transferred to the chip are a downlink low-noise amplifier and an uplink power amplifier.

The heat transferred from the low-noise amplifier and the power amplifier to the chip is calculated according to a certain ratio.

In the heat transfer model of the mobile phone terminal device, energy consumption $P_{chip}$ of the baseband chip of the mobile phone terminal device includes three parts, namely, baseband processing energy consumption $P_{BB}$, application processing energy consumption $P_{AP}$, and system energy consumption $P_{system}$.

Energy consumption parts of the baseband chip of the mobile phone terminal device: In a downlink communication scenario, the baseband processing of the mobile phone terminal device is dominated by channel decoding, and the energy consumption of the channel decoding is approximately in a linear relationship with the downlink transmission rate. The baseband processing energy consumption can be calculated by using the following formula:

$$P_{BB} = RK_{BB}F_0 \omega E_t.$$

$P_{BB}$ represents the baseband processing energy consumption, R represents the downlink transmission rate, $K_{BB}$ represents a quantity of logical operations required for processing each bit of information in a baseband processing algorithm, $F_0$ represents a fan-out factor of the chip, $\omega$ represents an activation factor of a transistor in the chip, and $E_t$ represents switching energy consumption of a single transistor in the chip.

The baseband processing energy consumption is associated with the quantity of logical operations $K_{BB}$ required for processing each bit of information in the baseband processing algorithm, the fan-out factor $F_0$ of the chip, the activation factor $\omega$ of a transistor in the chip, the switching energy consumption $E_t$ of a single transistor in the chip, and the like, and $E_t$ may be calculated as follows:

$$E_t = G_S L_{bound},$$

where $G_S$ is a ratio of switching energy consumption of a transistor to the Landauer limit, the subscript S represents a gate length of a transistor in semiconductor process technologies, $L_{bound} = k_B T_{env} \ln 2$ is the Landauer limit, $k_B$ is the Boltzmann constant, and $T_{env}$ represents an air temperature.

Energy consumption parts of the baseband chip of the mobile phone terminal device:

For the application processing energy consumption part, in a multimedia data transmission scenario, data transmitted from the base station to the mobile phone terminal device is to be decoded by an application processor of the mobile phone terminal device, namely, decoded by a CPU of the mobile phone terminal device. Further, the energy consumption of decoding multimedia data is approximately in a linear relationship with an amount of the multimedia data. The application processing energy consumption can be obtained from the following equation:

$$P_{AP} = RK_{AP}F_0 \omega E_t.$$

$P_{AP}$ represents the application processing energy consumption, $K_{AP} = N_{tr}F_{bit}$ is a quantity of logical operations required for processing each bit of information in an application, $N_{tr}$ is a quantity of transistors in a chip, and $F_{bit}$ is a quantity of CPU cycles required for processing each bit of data. In a multimedia application, the parameter $F_{bit}$ may be modeled as a random variable following a Gamma distribution. Therefore, a probability density function $f_{bit(\cdot)}$ of $F_{bit}$ is:

$$f_{bit}(F_{bit}) = \frac{1}{\beta \Gamma(\alpha)} \left(\frac{F_{bit}}{\beta}\right)^{\alpha-1} e^{\frac{F_{bit}}{\beta}},$$

where $\beta$ is a scale parameter, $\Gamma(\ )$ represents a Gamma function, $\alpha$ is a shape parameter, and $F_{bit} \geq 0$. In addition, $F_{bit}$ is independent and identically distributed at different moments.

Energy consumption parts of the baseband chip of the mobile phone terminal device:

The system energy consumption $P_{system}$ is energy consumed by the smartphone running system and local applications within a unit of time. In an initial state, the mobile phone terminal device operates only the system and local applications and has not established a communication link. Assuming that in the initial state, the mobile phone terminal device is in a thermal equilibrium state, the system energy consumption is associated with an initial ambient temperature, and can be calculated as:

$$P_{system} = h_{air} A (T_{sur}^0 - T_{env}).$$

$h_{air}$ represents an air convective heat transfer coefficient, A represents an area of a heat sink, $T_{sur}^0$ is an initial temperature of an area temperature $T_{sur}$ of a rear cover, $T_{env}$ represents an air temperature, and $T_{env} \leq T_{sur}^0 < T_{safe}$.

In the heat transfer model of the mobile phone terminal device, a total heat generation power of the chip includes the foregoing aspects, and the heat transfer model is associated with the occurrence of an energy consumption-related interruption.

The energy consumption-related interruption is defined as a communication interruption that occurs to avoid a burn when a heat generation power of a chip of a mobile phone causes a temperature of a rear cover of the mobile phone to exceed a human skin safety temperature in a communication process of the mobile phone terminal device. 45° C. is the maximum temperature to avoid a burn on human skin.

An association may be established between a chip temperature of the mobile phone terminal device and a surface temperature of the mobile phone terminal device by using a thermal equilibrium equation.

Figure 3:
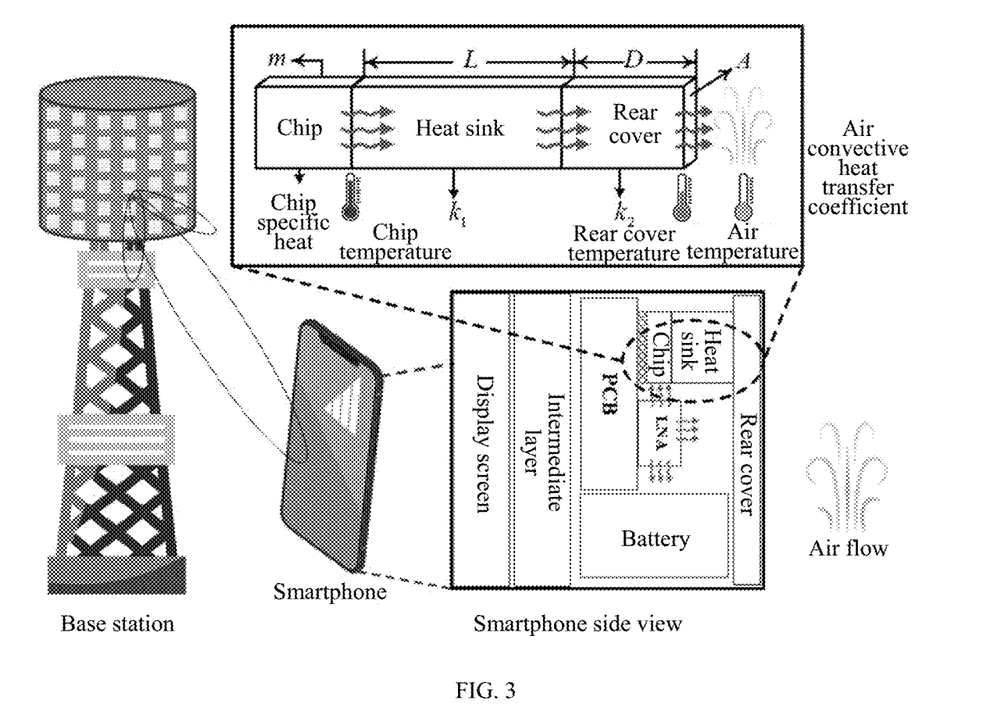
FIG. 3 is a principle diagram showing adjustment of an operating frequency and an operating voltage of a baseband chip of a mobile phone terminal device based on an energy consumption-related interruption model according to the present invention.

According to the definition of the energy consumption-related interruption, the energy consumption-related interruption is represented as the occurrence of an event $T_{chip} \geq T_{th}$. $T_{chip}$ represents the chip temperature, and $T_{th}$ represents the human skin safety temperature. Based on the heat transfer theory, the chip temperature $T_{chip}$ in FIG. 3 has a relationship with the temperature $T_{sur}$ of the rear cover of the smartphone.

$$z(T_{chip} - T_{env}) = h_{air} A (T_{sur} - T_{env}),$$

where $z = 1/(L/k_1 A + D/k_2 A + 1/h_{air} A)$, z represents a thermal conductivity, L represents a length of a heat sink, $k_1$ represents a thermal conductivity of the heat sink, A represents an area of the heat sink, D represents a thickness of the rear cover, $k_2$ represents a thermal conductivity of the rear cover, and $h_{air}$ represents an air convective heat transfer coefficient. In consideration of the limitation of $T_{sur} < T_{safe}$ and the foregoing formulas, a case in which no energy consumption-related interruption occurs is:

$$T_{chip} < \frac{h_{air} A}{z}(T_{safe} - T_{env}) + T_{env},$$

that is, $T_{th}=h_{air}A(T_{safe}-T_{env})/z+T_{env}$. Therefore, $T_{th}$ is determined by $T_{safe}$. That is, an energy consumption-related interruption is equivalent to the occurrence of the event $T_{sur} \geq T_{safe}$.

In a mobile communication process of the smartphone, the initial temperature of the temperature $T_{sur}$ of the rear cover of the mobile phone is $T_{sur}^0$, the total heat generation power of the chip is $Q_{Total}$, and the communication duration is t. In consideration of a one-dimensional non-steady state heat conduction process, the changing relationship between $T_{sur}$ and t satisfies:

$$T_{sur}(t) = \frac{Q_{Total}}{h_{air}A}\left(1 - e^{\frac{-zt}{c_{chip}m}}\right) + \left(T_{sur}^0 - T_{env}\right)e^{\frac{-zt}{c_{chip}m}} + T_{env},$$

where $z=1/(L/k_1A+D/k_2A+1/h_{air}A)$, and m represents a mass of the baseband chip.

The energy consumption-related interruption probability model of the mobile phone terminal device is:

$$p_{out}[T_{sur}(t)] =$$

$$P[T_{sur}(t) \geq T_{safe}] = \frac{1}{2} - \frac{\int_0^\infty \text{erf}\left[\frac{X(F_{bit}, t) - \mu}{\theta\sqrt{2}}\right](F_{bit})^{\alpha-1}e^{-\frac{F_{bit}}{\beta}}dF_{bit}}{2(\beta)^\alpha \Gamma(\alpha)}$$

where $$X(F_{bit}, t) = \frac{1}{BF_0\omega E_t(K_{BB} + N_{tr}F_{bit})}\left[\frac{h_{air}A(T_{safe} - T_{sur}^0)}{1 - e^{\frac{-zt}{c_{chip}m}}} - \lambda Q_{AM}\right],$$

where $p_{out[\;]}$ represents the probability of an energy consumption-related interruption, $P[\;]$ represents a probability of occurrence of an event in the square brackets, d represents a symbol d in integral calculus, t represents a communication duration, $T_{sur}(t)$ represents the temperature of the rear cover of the mobile phone, $T_{safe}$ represents a maximum temperature to avoid a burn on human skin, erf[ ] represents a Gaussian error function, $\mu$ represents an expectation in the Gaussian error function, $\theta$ represents a standard deviation in the Gaussian error function, $F_{bit}$ represents a quantity of CPU cycles required for processing each bit of data, $\alpha$ represents a shape parameter, $\beta$ represents a scale parameter, $X(F_{bit}, t)$ represents a function related to $F_{bit}$ and t, $\Gamma(\alpha)$ represents a Gamma function, B represents a bandwidth, $F_0$ represents a fan-out factor of the baseband chip, $\omega$ represents an activation factor of a transistor in the baseband chip, $E_t$ represents switching energy consumption of a single transistor in the baseband chip, $K_{BB}$ represents a quantity of logical operations required for processing each bit of information in a baseband processing algorithm, $N_{tr}$ represents a quantity of transistors in the baseband chip, $h_{air}$ represents an air convective heat transfer coefficient, A represents an area of a heat sink, $T_{sur}^0$ represents an initial temperature of the rear cover, z represents a thermal conductivity, $c_{chip}$ represents a specific heat of the baseband chip, m represents a mass of the baseband chip, $\lambda$ represents a ratio of heat transferred from a downlink low-noise amplifier and an uplink power amplifier to the baseband chip, and $Q_{AM}$ represents a heat generation power of the low-noise amplifier and the power amplifier.

For the mobile phone terminal device, adjustments to the mobile phone terminal device according to current conditions of the system and the mobile phone terminal device based on the prediction of the energy consumption-related interruption model include: reducing an operating frequency and an operating voltage of the baseband chip of the mobile phone terminal device.

The baseband processing energy consumption, application processing energy consumption, and system energy consumption of a chip of the mobile phone terminal device can be reduced by reducing the operating frequency and the operating voltage of the baseband chip of the mobile phone terminal device, so that a probability that an energy consumption-related interruption occurs can be reduced, and the occurrence of an energy consumption-related interruption is avoided, thereby ensuring the quality of service for users.

The operating frequency and the operating voltage of the baseband chip of the mobile phone terminal device are adjusted according to the probability of an interruption predicted by using the energy consumption-related interruption model. This technique can adjust the power supply voltage and frequency according to a probability of an energy consumption-related interruption of the system.

As shown in FIG. 3, a performance management unit may have the function of predicting a probability of an energy consumption-related interruption of the mobile phone terminal. When a probability of an energy consumption-related interruption of the mobile phone terminal in a next stage is calculated, the operating frequency and the operating voltage of the CPU of the baseband chip are adjusted according to a corresponding adjustment algorithm. The performance management unit outputs two signals, namely, a voltage signal $V_{Target}$ and a frequency signal $f_{target}$ required by the system. $f_{target}$ is inputted into a clock generation unit. The clock generation unit provides the required operating frequency. The other signal $V_{Target}$ is inputted into a voltage adjustment module, and then the operating voltage required by the system is generated.

In the method based on a prediction model, some signals related to the performance of the system, interruptions, and other information are mainly acquired to determine the performance of the system. This technique predicts performance required by the system in a next stage according to current parameters related to performance of the system.

A probability that an energy consumption-related interruption occurs in the system in a next stage is predicted according to the calculation of the energy consumption-related interruption model. To avoid the occurrence of an energy consumption-related interruption, an operating frequency required by the baseband chip is adjusted, to adjust a clock frequency setting of the chip.

The operating frequency required by the baseband chip is adjusted, a corresponding operating voltage is calculated according to a new operating frequency of the baseband chip, and the power management module adjusts a voltage supplied to the CPU of the baseband chip.

The present invention uses a method for adjusting an operating frequency of a baseband chip similar to an open-loop control method, which is a method for performing segmented frequency adjustment according to a ratio $\beta$ based on the calculation of the energy consumption-related interruption probability model.

$$f_{next}=\beta \cdot f_{now}.$$

$\beta$ represents the ratio of an adjustment, $f_{now}$ represents an operating frequency before the adjustment, and $f_{next}$ represents an operating frequency after the adjustment.

For current different calculated probabilities of an energy consumption-related interruption of the mobile phone terminal, a current operating frequency of the baseband chip is adjusted according to different ratios.

In an actual design, an algorithm for adjusting the operating frequency of the baseband chip in a segmented manner according to a ratio is as follows:

(1) acquiring a current calculated probability of an energy consumption-related interruption of the mobile phone terminal;

(2) if the current calculated probability of an energy consumption-related interruption is greater than or equal to 90%, directly adjusting the operating frequency of the baseband chip to 50% of a current frequency;

(3) if the current calculated probability of an energy consumption-related interruption is greater than or equal to 80% and less than 90%, directly adjusting the operating frequency of the baseband chip to 60% of the current frequency;

(4) if the current calculated probability of an energy consumption-related interruption is greater than or equal to 70% and less than 80%, directly adjusting the operating frequency of the baseband chip to 70% of the current frequency;

(5) if the current calculated probability of an energy consumption-related interruption is greater than or equal to 60% and less than 70%, directly adjusting the operating frequency of the baseband chip to 80% of the current frequency;

(6) if the current calculated probability of an energy consumption-related interruption is greater than or equal to 50% and less than 60%, directly adjusting the operating frequency of the baseband chip to 90% of the current frequency; and (7) making no adjustment in other cases.

A corresponding operating voltage is calculated according to a new operating frequency of the baseband chip, and the power management module adjusts a voltage supplied to the CPU of the baseband chip. The primary reference of the adjustment is a relationship between a power supply voltage and a frequency of the baseband chip. For a high-speed component such as a processor based on a CMOS process, to ensure the normal operation of the component, a voltage and a frequency of the component need to satisfy:

$$f = k(V-V_T)^2/V.$$

where k is a constant coefficient, V is a supply voltage for the component, and $V_T$ is a threshold voltage. Generally $V_T$ is much less than V. The frequency and the voltage are approximately in a linear relationship:

$$f \propto k \cdot V.$$

Therefore, a new supply voltage may be obtained according to the adjusted operating frequency, and the power management module adjusts a voltage supplied to the CPU of the baseband chip.

In an optimization process of a mobile terminal device, for the adjustment of an operating frequency and a supply voltage of a baseband chip of a mobile phone, the adjustment technique for a mobile phone terminal device in the present invention is that all cores of a multi-core processor are considered as one core, and after the core is adjusted, the same adjustment is made to operating frequencies of the remaining cores just like the core, thereby satisfying a performance requirement.

Figure 4:
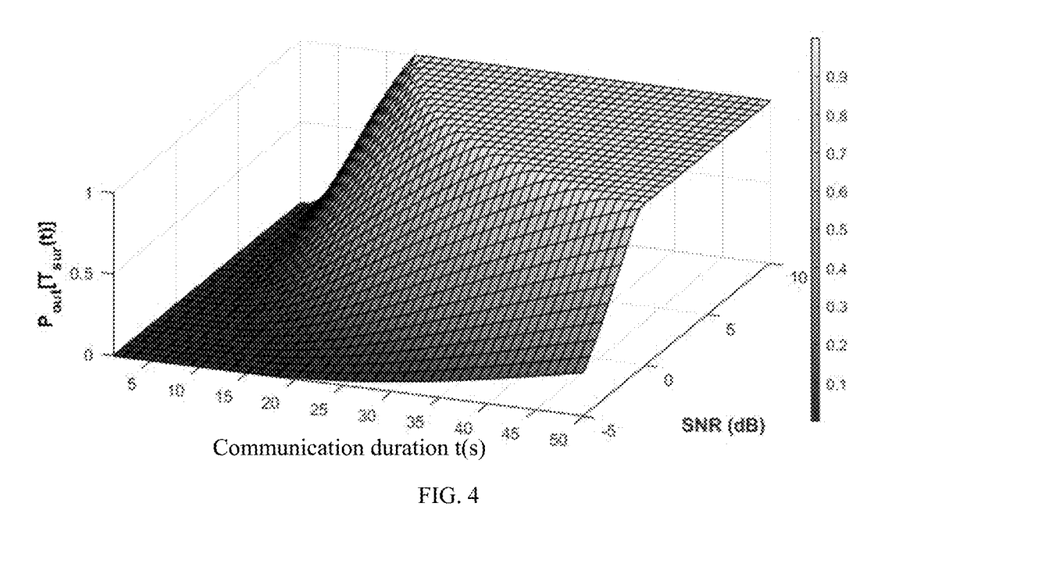
FIG. 4 is a diagram showing a relationship between a probability of an energy consumption-related interruption, a signal-to-noise ratio (SNR) and a communication duration according to the present invention.

FIG. 4 is a diagram showing a relationship between a probability of an energy consumption-related interruption, an SNR and a communication duration according to the present invention. Through the diagram of simulation, it can be seen that in simulation results of an energy consumption-related interruption model, when $\rho=5$ dB, an energy consumption-related interruption definitely occurs in a case of $t \geq 23$ s, namely, $p_{out}[T_{sur}(t)]=1$. When $\rho=10$ dB, an energy consumption-related interruption definitely occurs in a case of $t \geq 13.4$ s. Therefore, based on simulated prediction results of calculating an energy consumption-related interruption probability model, an operating frequency and an operating voltage of a baseband chip of a mobile phone terminal device may be adjusted, to reduce the power consumption of the mobile phone terminal device, so that a probability of an energy consumption-related interruption can be reduced and the occurrence of an energy consumption-related interruption can be avoided, thereby ensuring the normal communication and ensuring the quality of service for users.

It can be easily understood by those skilled in the art that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A method for optimizing a mobile phone terminal based on a probability of an energy consumption-related interruption, comprising:

S1. predicting a probability of an energy consumption-related interruption in real time, wherein the energy consumption-related interruption refers to that when a surface temperature of the mobile phone terminal exceeds a lowest temperature that can cause a burn on human skin, a baseband chip of the mobile phone terminal reduces computing capabilities of the mobile phone terminal to reduce a heat generation amount of the mobile phone terminal and the surface temperature of the mobile phone terminal, when the baseband chip has no redundant computing resources for data processing, a performance of a mobile communication system becomes unacceptable, and eventually leads to the energy consumption-related interruption; and S2. adjusting an operating frequency of the baseband chip of the mobile phone terminal according to the predicted probability of an energy consumption-related interruption;

wherein step S2 comprises:

if a current probability of an energy consumption-related interruption is greater than or equal to 90%, adjusting the operating frequency of the baseband chip to 50% of a current frequency;

if the current probability of an energy consumption-related interruption is greater than or equal to 80% and less than 90%, adjusting the operating frequency of the baseband chip to 60% of the current frequency;

if the current probability of an energy consumption-related interruption is greater than or equal to 70% and less than 80%, adjusting the operating frequency of the baseband chip to 70% of the current frequency;

if the current probability of an energy consumption-related interruption is greater than or equal to 60% and less than 70%, adjusting the operating frequency of the baseband chip to 80% of the current frequency;

if the current probability of an energy consumption-related interruption is greater than or equal to 50% and less than 60%, adjusting the operating frequency of the baseband chip to 90% of the current frequency; and making no adjustment in other cases,
wherein the probability of an energy consumption-related interruption is predicted by using an energy consumption-related interruption probability model in step S1, and the energy consumption-related interruption probability model is as follows:

$$p_{out}[T_{sur}(t)] =$$

$$P[T_{sur}(t) \geq T_{safe}] = \frac{1}{2} - \frac{\int_0^\infty \text{erf}\left[\frac{X(F_{bit}, t) - \mu}{\theta\sqrt{2}}\right](F_{bit})^{\alpha-1} e^{\frac{F_{bit}}{\beta}} dF_{bit}}{2(\beta)^\alpha \Gamma(\alpha)}$$

wherein $$X(F_{bit}, t) = \frac{1}{BF_0 \omega E_t (K_{BB} + N_{tr} F_{bit})} \left[\frac{h_{air} A(T_{safe} - T_{sur}^0)}{1 - e^{\frac{zt}{c_{chip} m}}} - \lambda Q_{AM}\right],$$

wherein $p_{out[\ ]}$ represents the probability of an energy consumption-related interruption, $P[\ ]$ represents a probability of occurrence of an event in the square brackets, d represents a symbol d in integral calculus, t represents a communication duration, $T_{sur}(t)$ represents the temperature of the rear cover of the mobile phone, $T_{safe}$ represents a maximum temperature to avoid a burn on human skin, erf[ ] represents a Gaussian error function, μ represents an expectation in the Gaussian error function, θ represents a standard deviation in the Gaussian error function, $F_{bit}$ represents a quantity of CPU cycles required for processing each bit of data, α represents a shape parameter, β represents a scale parameter, $X(F_{bit}, t)$ represents a function related to $F_{bit}$ and t, $\Gamma(\alpha)$ represents a Gamma function, B represents a bandwidth, $F_0$ represents a fan-out factor of the baseband chip, ω represents an activation factor of a transistor in the baseband chip, $E_t$ represents switching energy consumption of a single transistor in the baseband chip, $K_{BB}$ represents a quantity of logical operations required for processing each bit of information in a baseband processing algorithm, $N_{tr}$ represents a quantity of transistors in the baseband chip, $h_{air}$ represents an air convective heat transfer coefficient, A represents an area of a heat sink, $T_{sur}^0$ represents an initial temperature of the rear cover, z represents a thermal conductivity, $c_{chip}$ represents a specific heat of the baseband chip, m represents a mass of the baseband chip, λ represents a ratio of heat transferred from a downlink low-noise amplifier and an uplink power amplifier to the baseband chip, and $Q_{AM}$ represents a heat generation power of the low-noise amplifier and the power amplifier.

2. The method according to claim 1, further comprising:
S3. obtaining a new operating voltage according to the adjusted operating frequency, and supplying, by a power management module, the same to a CPU of the baseband chip.

3. The method according to claim 2, wherein an operating voltage and an operating frequency of a component satisfy:

$$f = k(V - V_T)^2 / V$$

wherein k is a constant coefficient, $f$ represents an operating frequency of the CPU, V represents an operating voltage of the CPU, and $V_T$ represents a threshold voltage.

4. The method according to claim 1, wherein all cores of a multi-core processor are considered as one core, and after the core is adjusted, the same adjustment is made to operating frequencies of the remaining cores.

5. A smartphone terminal, comprising: a non-transitory computer-readable storage medium and a processor, wherein
the computer-readable storage medium is configured to store executable instructions; and
the processor is configured to read the executable instructions stored in the computer-readable storage medium, and to perform the method for optimizing a mobile phone terminal based on a probability of an energy consumption-related interruption according to claim 1.

* * * * *